(12) United States Patent
Kokuzian et al.

(10) Patent No.: US 6,547,195 B1
(45) Date of Patent: Apr. 15, 2003

(54) INFANT CAR SEAT SUPPORT ASSEMBLY

(76) Inventors: Peter B. Kokuzian, 821 Abbey Dr., Glen Ellyn, IL (US) 60137; Michelle L. Kokuzian, 821 Abbey Dr., Glen Ellyn, IL (US) 60137

( * ) Notice: Subject to any disclaimer, the term of this patent is extended or adjusted under 35 U.S.C. 154(b) by 0 days.

(21) Appl. No.: 09/931,785

(22) Filed: Aug. 17, 2001

Related U.S. Application Data

(63) Continuation-in-part of application No. 09/519,752, filed on Mar. 6, 2000, now Pat. No. 6,290,290.

(51) Int. Cl.$^7$ .................... A47K 1/04; A47C 13/00
(52) U.S. Cl. ............... 248/129; 248/164; 248/432; 297/130
(58) Field of Search ............... 248/129, 128, 248/150, 166, 164, 432, 188.8; 297/130, 250.1, 256.16, 440.22; 108/118, 119; 16/38, 35 R

(56) References Cited

U.S. PATENT DOCUMENTS

| | | | |
|---|---|---|---|
| 701,901 A | | 6/1902 | Lewis |
| 1,426,160 A | * | 8/1922 | Driver .................. 108/26 |
| 1,941,902 A | * | 1/1934 | Lewis ................... 5/98.3 |
| 2,753,586 A | * | 7/1956 | Metz .................... 16/18 |
| 3,502,291 A | | 3/1970 | Ackerman et al. |
| 3,839,754 A | * | 10/1974 | Hooper ................. 5/98.2 |
| 4,065,175 A | | 12/1977 | Perego |
| 4,361,930 A | * | 12/1982 | Seesengood ............ 16/38 |
| 4,788,741 A | * | 12/1988 | Hilborn ............... 16/35 R |
| 5,103,530 A | * | 4/1992 | Andrisin, III et al. .... 16/20 |
| 5,146,635 A | | 9/1992 | Gastle et al. |
| 5,190,254 A | * | 3/1993 | Maguire ............... 248/164 |
| 5,248,181 A | * | 9/1993 | Efthimiou ............. 297/130 |
| 5,364,137 A | | 11/1994 | Shimer |
| 5,470,039 A | * | 11/1995 | Hilger ................ 248/164 |
| 5,496,094 A | * | 3/1996 | Schwartzkopf et al. ... 297/45 |
| 5,762,310 A | * | 6/1998 | Schill ................. 248/432 |
| 5,890,696 A | * | 4/1999 | Ozawa ................. 248/677 |
| 5,951,102 A | | 9/1999 | Poulson et al. |

* cited by examiner

*Primary Examiner*—Anita King

(57) ABSTRACT

An infant car seat support assembly for securing an infant car seat to a portable support assembly. The infant car seat support assembly includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

15 Claims, 5 Drawing Sheets

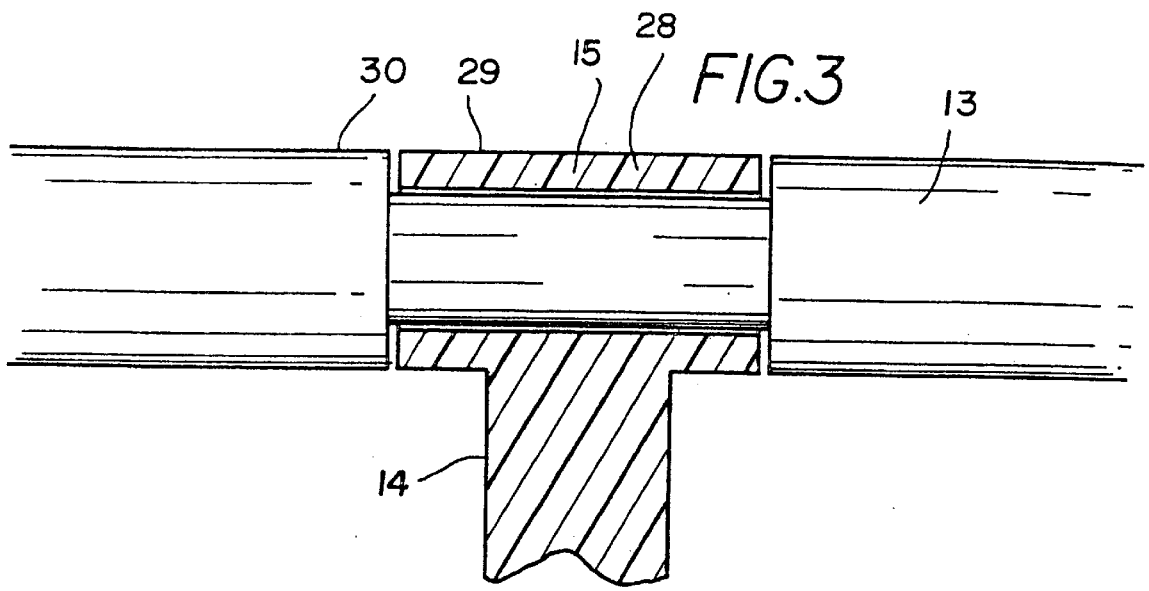
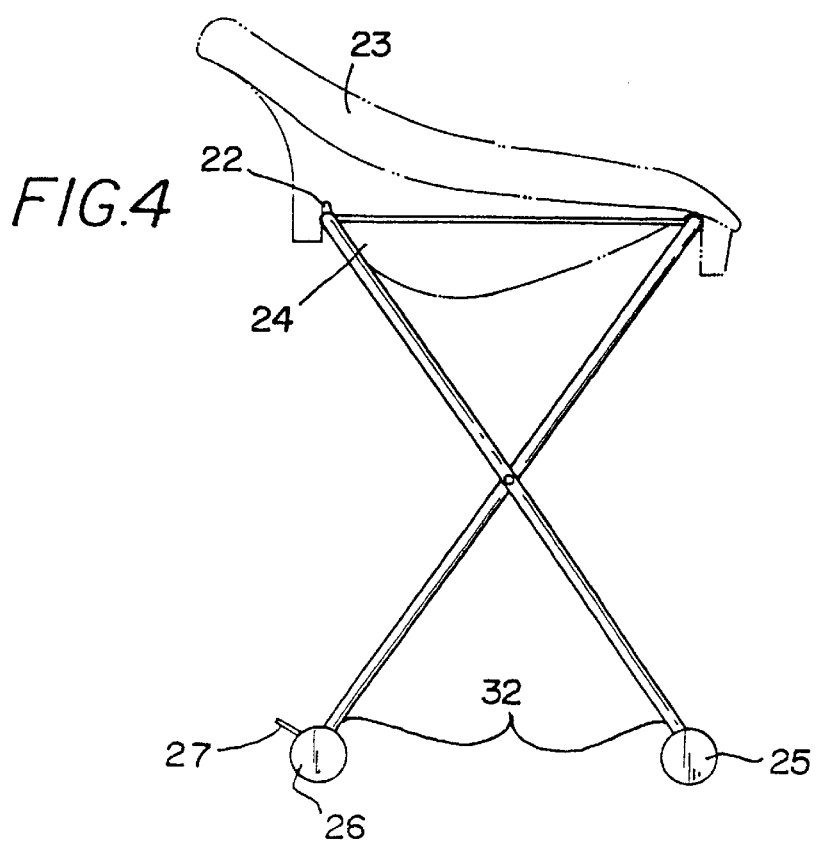

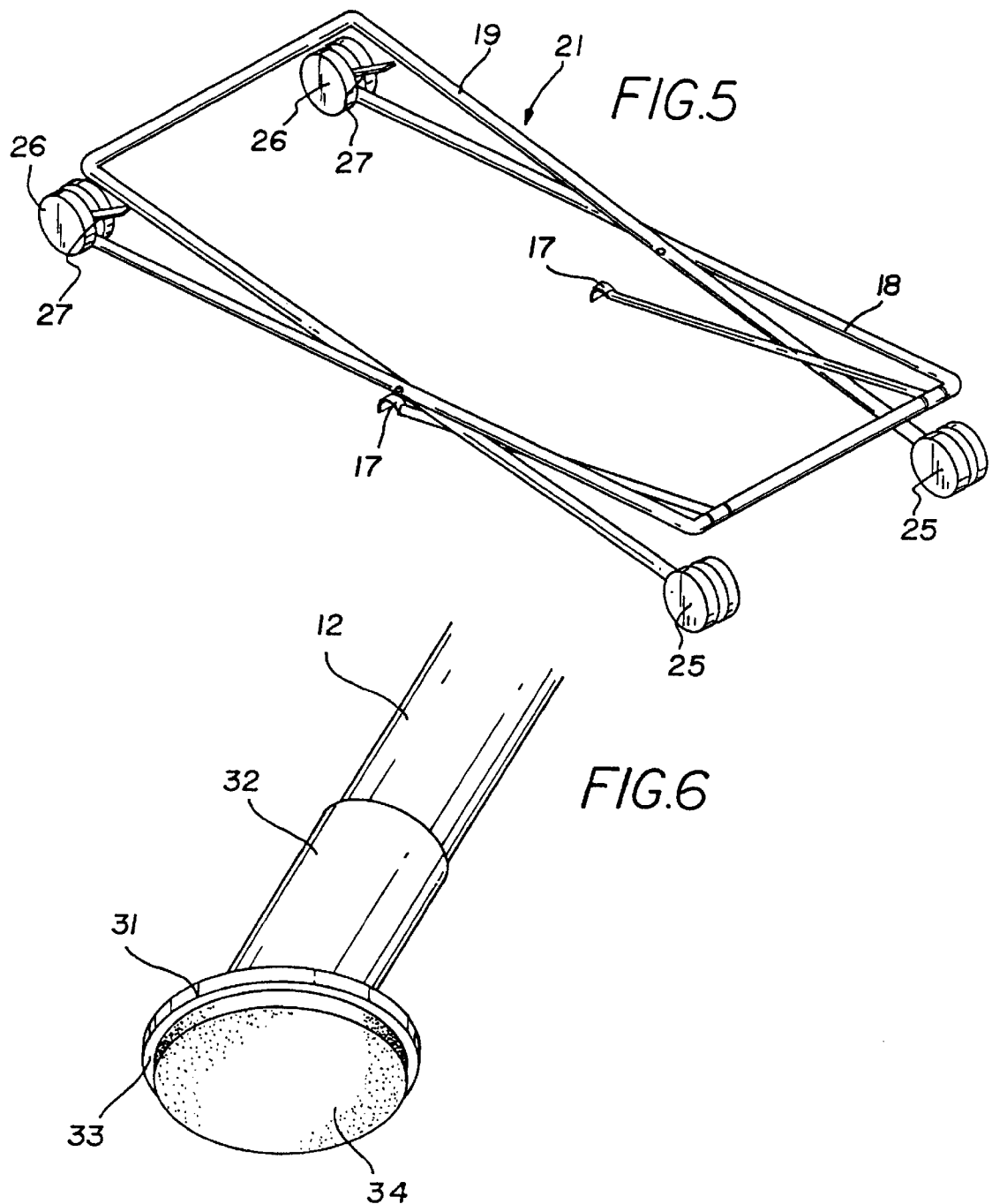

INFANT CAR SEAT SUPPORT ASSEMBLY

REFERENCE TO RELATED APPLICATION

This application is a continuation-in-part of application Ser. No. 09/519,752, filed Mar. 6, 2000, now U.S. Pat. No. 6,290,290.

BACKGROUND OF THE INVENTION

1. Field of the Invention

The present invention relates to devices that hold infant car seats and more particularly pertains to a new infant car seat support assembly for securing an infant car seat to a portable support assembly.

2. Description of the Prior Art

The use of devices that hold infant car seats is known in the prior art. More specifically, devices that hold infant car seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,454,575; U.S. Pat. No. 5,564,778; U.S. Pat. No. 5,248,181; U.S. Pat. No. 5,660,430; U.S. Pat. No. 4,967,672; and U.S. Pat. No. Des. 398,785.

While these devices fulfill their respective, particular objectives and requirements, the aforementioned patents do not disclose a new infant car seat support assembly. The inventive device includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member Is couplable to a respective one of the cross members for holding the support members in the open position. One of the cross members is designed to securely engage an infant car seat clip, whereby the infant car seat support assembly can be securely engaged to the infant car seat.

In these respects, the infant car seat support assembly according to the present invention substantially departs from the conventional concepts and designs of the prior art, and in so doing provides an apparatus primarily developed for the purpose of securing an infant car seat to a portable support assembly.

SUMMARY OF THE INVENTION

In view of the foregoing disadvantages inherent in the known types of devices that hold infant car seats now present in the prior art, the present invention provides a new infant car seat support assembly construction wherein the same can be utilized for securing an infant car seat to a portable support assembly.

The general purpose of the present invention, which will be described subsequently in greater detail, is to provide a new infant car seat support assembly apparatus and method which has many of the advantages of the devices that hold infant car seats mentioned heretofore and many novel features that result in a new infant car seat support assembly that is not anticipated, rendered obvious, suggested, or even implied by any of the prior art devices that hold infant car seats, either alone or in any combination thereof.

To attain this, the present invention generally comprises a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new infant car seat support assembly apparatus and method which has many of the advantages of the devices that hold infant car seats mentioned heretofore and many novel features that result in a new infant car seat support assembly which is not anticipated, rendered obvious, suggested, or even implied by any of the prior art devices that hold infant car seats, either alone or in any combination thereof.

It is another object of the present invention to provide a new infant car seat support assembly that may be easily and efficiently manufactured and marketed.

It is a further object of the present invention to provide a new infant car seat support assembly that is of a durable and reliable construction.

An even further object of the present invention is to provide a new infant car seat support assembly which is susceptible of a low cost of manufacture with regard to both materials and labor, and which accordingly is then susceptible of low prices of sale to the consuming public, thereby making such infant car seat support assembly economically available to the buying public.

Still yet another object of the present invention is to provide a new infant car seat support assembly which provides in the apparatuses and methods of the prior art some of the advantages thereof, while simultaneously overcoming some of the disadvantages normally associated therewith.

Still another object of the present invention is to provide a new infant car seat support assembly for securing an infant car seat to a portable support assembly.

Yet another object of the present invention is to provide a new infant car seat support assembly which includes a pair of support members. Each support member has a pair of legs and a cross member extending between upper ends of the pair of legs. The support members are pivotally coupled to each other in a manner such that the cross members are positioned in a substantially parallel spaced relationship to each other to define an open position. The infant car seat support assembly also has at least one brace member that has opposite ends. Each end of the brace member is couplable to a respective one of the cross members for holding the support members in the open position. One of the cross members is designed to securely engage an infant car seat clip, whereby the infant car seat support assembly can be securely engaged to the infant car seat.

Still yet another object of the present invention is to provide a new infant car seat support assembly that may be used in restaurants, hotels, banquet facilities, hair salons and similar facilities.

Even still another object of the present invention is to provide a new infant car seat support assembly that can be used on a standard infant car seat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of the present invention, illustrating how the first end of the brace member is hingably coupled to a cross member.

FIG. 4 is a schematic side view of the present invention, illustrating how a standard infant seat is engaged to the infant car seat support assembly.

FIG. 5 is a schematic perspective view of the present invention, illustrating the infant car support assembly being in the stored position.

FIG. 6 is a schematic perspective view of the present invention, illustrating the foot design.

DESCRIPTION OF THE PREFERRED EMBODIMENT

Figure 1:
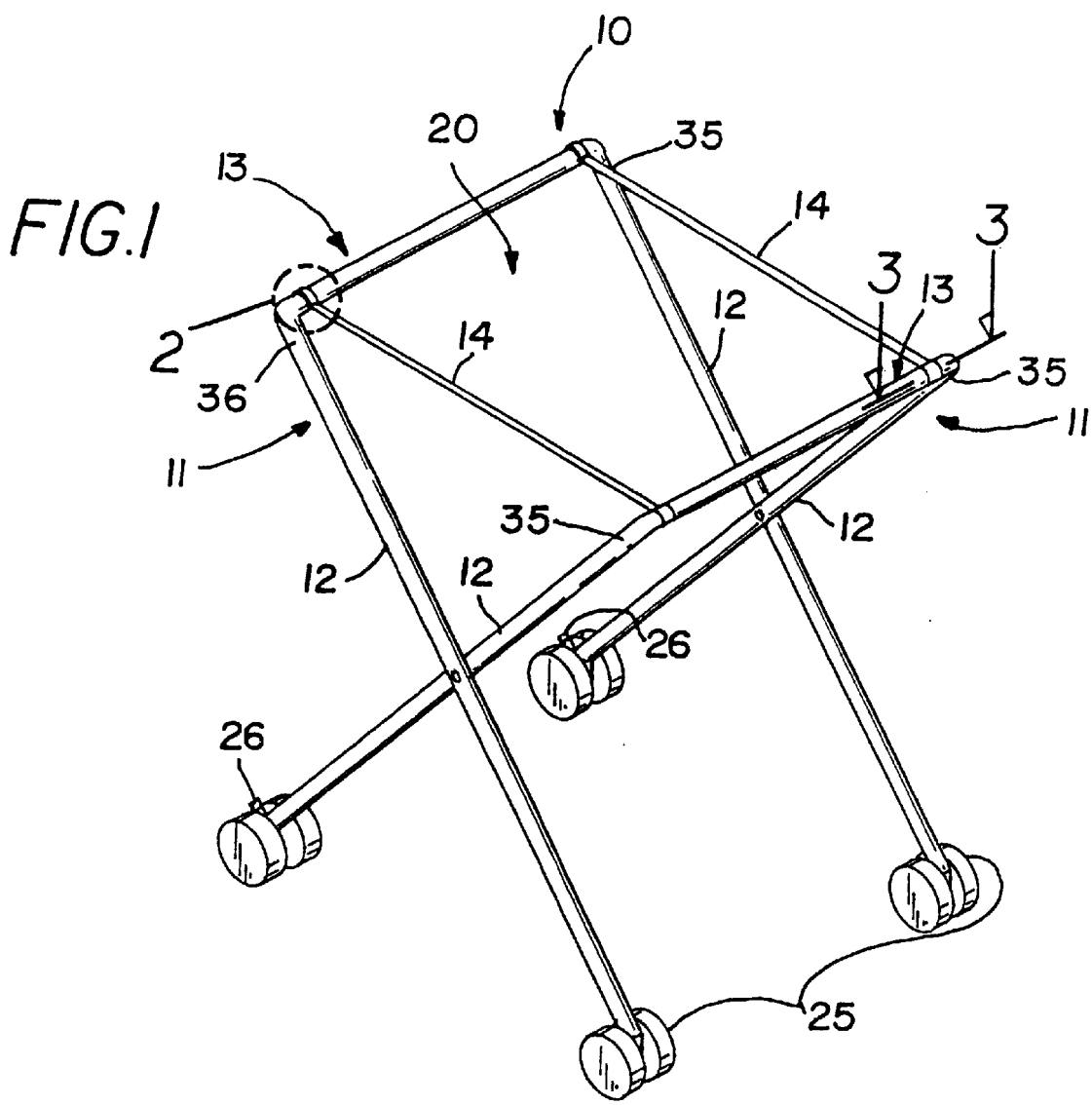
FIG. 1 is a schematic perspective view of a new infant car seat support assembly, illustrating the open position, according to the present invention.
Figure 2:
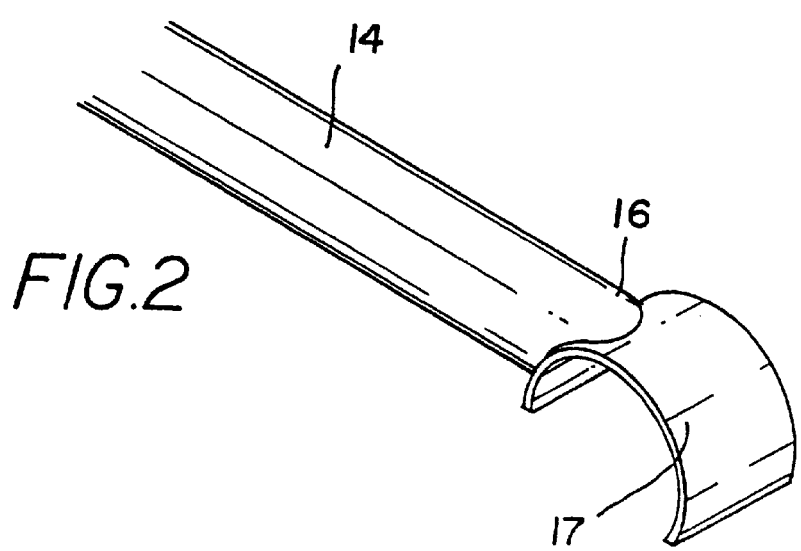
FIG. 2 is a schematic perspective view of the present invention, illustrating the clip member of the second end of each brace member.
Figure 7:
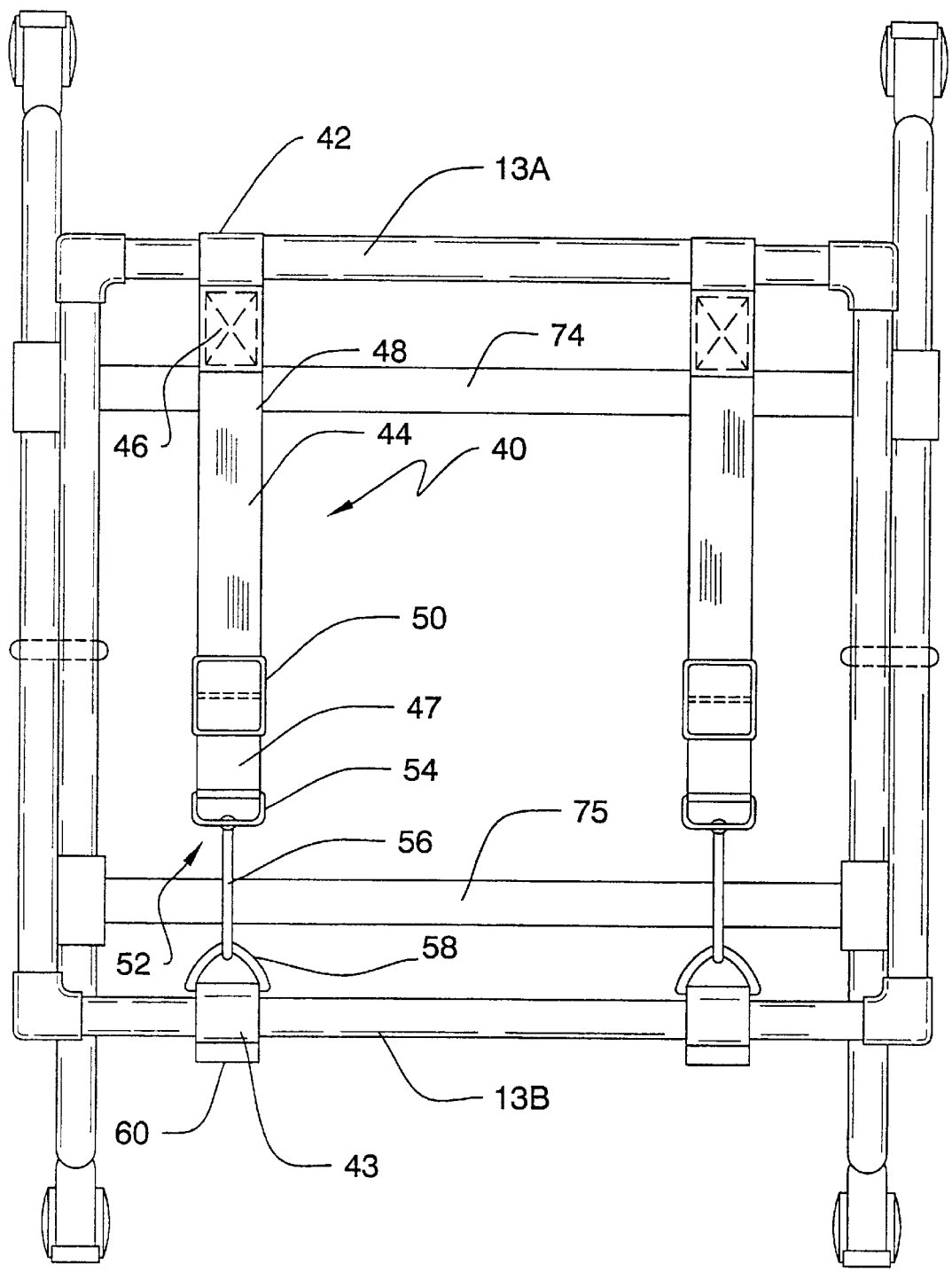
FIG. 7 is a schematic top view of an embodiment of the present invention particularly illustrating an optional flexible spanning assembly.
Figure 9:
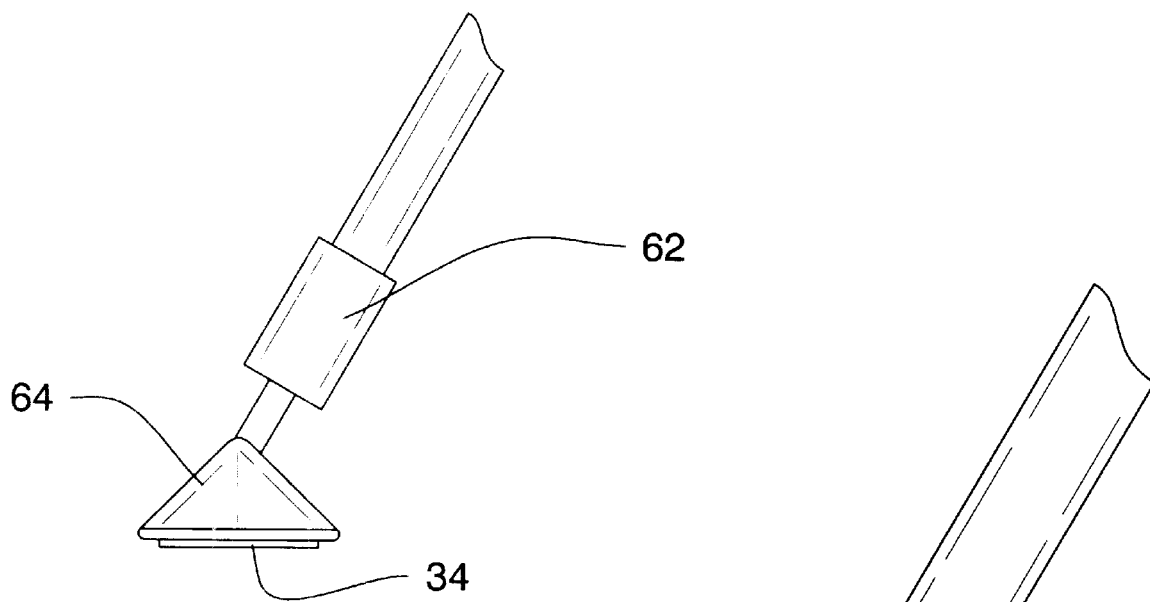
FIG. 9 is a schematic partial side view of a lower portion of a leg with a foot mounted thereon.
Figure 8:
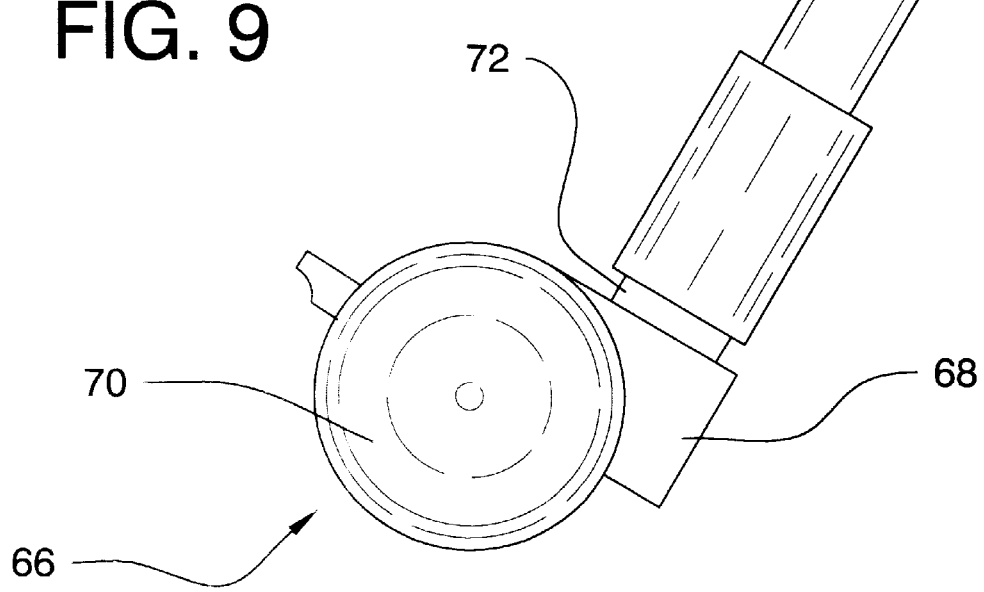
FIG. 8 is a schematic partial side view of an embodiment of the present invention particularly illustrating an optional caster wheel configuration.

With reference now to the drawings, and in particular to FIGS. 1 through 9 thereof, a new infant car seat support assembly embodying the principles and concepts of the present invention and generally designated by the reference numeral 10 will be described.

As best illustrated in FIGS. 1 through 6, the infant car seat support assembly 10 generally comprises a pair of support members 11. Each of the support members 11 has a pair of legs 12 and a respective cross member 13. The cross members 13 extend between upper ends 35, 36 of the pair of legs 12. The support members 11 are pivotally coupled to each other in a manner such that the cross members 13 are positioned in a substantially parallel spaced relationship to each other.

The infant car seat support assembly 10 also has a pair of brace members 14. Each brace member 14 has a first end 15 and a second end 16. The first end 15 of each brace member 14 is hingably coupled to the cross member 13 of a first one 18 of said support members 11. The second end 16 of each brace member 14 has a clip member 17. The clip member 17 may be engaged to the cross member 13 of a second one 19 of the support members 11. When each of the clip members 17 are engaged with the cross member 13 of the second one 19 of the support members 11, the cross members 13 are held in a substantially parallel spaced relationship to each other to define an open position 20 (see FIG. 1). When the clip members 17 are not engaged with the cross member 13 of the second one 19 of the support members 11, the infant car seat assembly is in a stored position 21 (see FIG. 5).

The cross members 13 are designed to hold a standard infant car seat 23 when the infant car seat assembly 11 is in the open position 20 (see FIG. 4). At least one of the cross members 13 is designed for securely engaging a clip 22 of a infant car seat 23 that is positioned proximate a back 24 of a standard infant car seat 23. When the cross member 13 is engaged with the clip 22 of an infant car seat 23, the infant car seat is secured to 23 the infant car seat support assembly 10.

The infant car seat support assembly 11 may have a plurality of wheels 25. Each wheel 25 is coupled to an associated distal end 32 of a respective one of the legs 12 of the pair of support members 11. In addition, each of the wheels 25 is free to rotate 360 degrees around a substantially vertical axis for facilitating movement of the infant car seat support assembly 10.

The plurality of wheels 25 includes at least two locking wheels 26. Each locking wheel 26 has a locking mechanism 27 for preventing rotation of the locking wheel 26 about a substantially horizontal axis. The locking wheels 26 prevent movement of the infant car support assembly. Each of the locking wheels 26 are coupled to an associated one of said pair of legs 12 of a first one 18 of said support members 11.

If the infant car seat support assembly 10 is not equipped with a plurality of wheels 25, the infant car seat support assembly 10 may be equipped with a plurality of feet 31 (see FIG. 6). Each foot 31 is coupled to an associated distal end 32 of a respective one of the legs 12 of the support members 11. In addition, each foot 31 has a pad of non-skid material 34 coupled to the bottom face 33 of the foot to prevent sliding when the bottom face 33 abuts a supporting surface.

Each first end 15 of said brace members 14 has a generally tubular portion 28 transverse to a longitudinal axis of said brace member 14. A longitudinal axis of each tubular portion 28 is coaxial with a longitudinal axis of the cross member 13 of the first one 18 of the support members 11. An outer surface 29 of each of the tubular portions 28 is substantially flush with an outer surface 30 of the cross member 13 of the first one 18 of the support members 11.

In use, the clip member 17 on the second end 16 of each brace member 14 is engaged with the cross member 13 of the second one 19 of the support members 11, thereby putting the infant car seat support assembly 10 in the open position 20. A standard infant car seat 23 is then placed on top of the infant car seat support assembly 10 and engaged with the cross members 13. One of the cross members 13 is received in the clip 22 of the infant car seat 23, thereby securing the infant car seat 23 to the infant car seat support assembly 10.

Optionally, the infant car seat support assembly of the invention may employ a spanning assembly 40 in place of the bracing member described above (see FIG. 7). The spanning assembly removably links the cross members 3 of the pair of legs 12. The spanning assembly has opposite ends 42, 43 that define a length therebetween for the spanning assembly. Each end 42, 43 is couplable to a respective one of the cross members for restricting movement of the cross members away from each other a distance greater than the length of the spanning assembly when the support members are moved into the open position. Significantly, the length of the spanning assembly is adjustable for adjusting the distance between the cross members in the open position such that the position of the cross members relative to each other may be adjusted to fit the particular structures of various types and sizes of infant car seats. The structures of the various infant car seats may vary from one brand or design to another, and adjustment of the distance between the cross members while the support assembly is in the open position permits adjustment to these variations.

In one embodiment of the invention, the spanning assembly may comprise a strap 44 generally extending between the ends of the spanning assembly. A first end portion 46 of the strap is formed into a loop that is looped about a first one 13A of the cross members for securing the strap to the first cross member. The first end portion is mounted to an intermediate portion 48 of the strap to form the loop.

A slide buckle 50 may be slidably mounted on the strap 44 between the first and a second end portion 47 of the strap. The second end portion is mounted on the slide buckle such that the second end portion is slidably mounted on the strap (by the slide buckle) to form a loop that has an adjustable perimeter size. Thus, sliding of the slide buckle along the strap functions to increase or decrease the size of the loop, which in turn serves to draw the ends 42, 43 of the spanning assembly closer together or to permit the ends of the spanning assembly to move apart, depending upon the direction of movement of the slide buckle.

A clip assembly 52 may be mounted on the strap in a manner permitting sliding of the clip assembly along the strap. The clip assembly 52 may comprise a base loop 54 that has a portion of the strap extending therethrough, such as the loop formed by the slide buckle. The clip assembly may also include a clip 56 that is swivelly mounted on the base loop. The clip may have a hook portion and a flexible closure portion extending across a gap in the hook portion for selectively closing the gap in the hook portion.

A ring 58 may be mounted on a second one 13B of the cross members. The ring is adapted for being removably engaged by the clip 56 of the clip assembly. The ring may be mounted on the second cross member by a band 60 looped about the second cross member.

As a further option, the support assembly includes a ground engaging member mounted on a lower end of each of the legs of the support members. Preferably, each ground engaging member is removably mounted on the lower end of one of the legs of the support members for permitting removal and replacement of the ground engaging member.

As noted above, each of the ground engaging members may comprise a foot 31 removably mounted on the lower end of one of the legs. Each foot may comprise a socket portion 62 (see FIG. 9) for receiving the lower end of one of the legs and a pad portion 64 that is swivelly coupled to the socket portion for permitting adjustment of an orientation of the pad portion with respect to the socket portion.

Additionally, each of the ground engaging members may comprise a caster wheel assembly 66 (see FIG. 8) that may be interchangeably mounted on the leg in place of the foot described above, depending on if mobility of the support assembly is desired or if a stationary orientation of the support assembly is desired.

Each caster wheel assembly 66 may comprise a base member 68, and at least one wheel 70 rotatably mounted on the base member. Preferably, a pair of wheels 70 are mounted on the base member with each wheel of the pair of wheels is mounted on opposite sides of the base member from the other of the wheels. The caster wheel assembly may also include a mounting member 72 that is mounted on the base member and is adapted for removably mounting on the lower end of one of the legs of the support assembly. The mounting member 72 may be rotatably mounted on the base member 68 for rotation about a first axis. The mounting member is mountable on the lower end of one of the legs such that the first axis is substantially collinear with a longitudinal axis of the leg so that the base member and the wheel or wheels rotate about the longitudinal axis of the leg. This feature tends to orient the base member and wheel or wheels away from the leg, and tends to make the support assembly more stable by keeping the wheels in the same orientation while still permitting the rotation of the wheels if needed. Illustratively, the mounting member may have a portion that is removably insertable into the lower end of one of the legs for mounting the caster wheel assembly on the leg.

Optionally, a pair of support bars 74, 75 may be provided. Each support bar 74, 75 extends between the legs 12 of one of the support members 11 for maintaining the distance between the legs and thereby reinforcing the support member and the positioning of the legs.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An infant car seat support assembly comprising:

a pair of support members, each support member having a pair of legs and a cross member extending between upper ends of said pair of legs, at least one of said cross members being adapted for securely engaging an infant car seat clip positioned proximate a back of the infant car seat for supporting said infant car seat in an elevated position, said support members being pivotally coupled to each other such that said cross members are pivotable with respect to each other between a collapsed position and an open position; and a spanning assembly for removably linking the cross members of said pair of legs, said spanning assembly having opposite ends defining a length of said spanning assembly therebetween, each end being couplable to a respective one of said cross members for restricting movement of said cross members away from each other a distance greater than the length of said spanning assembly when said support members are moved into said open position;

wherein said spanning assembly includes a strap extending between the ends of said spanning assembly, a first end portion of said strap including a loop looped about a first one of said cross members for securing said strap to said first cross member.

2. The support assembly of claim 1 wherein said spanning assembly said first end portion and a second end portion of said strap, said second end portion being mounted on said slide buckle such that said second end portion is slidably mounted on said strap to form a loop having an adjustable perimeter size.

3. The support assembly of claim 2 wherein the spanning assembly further comprises:

a clip assembly mounted on the strap in a manner permitting sliding of said clip assembly along said strap, said clip assembly comprising:
a base loop having a portion of said strap extending therethrough; and
a clip swivelly mounted on said base loop; and a ring being mounted on a second one of said cross members, said ring being adapted for being removably engaged by said clip of said clip assembly, said ring being mounted on said second cross member by a band looped about said second cross member.

4. The support assembly of claim 1 additionally comprising a ground engaging member mounted on a lower end of each of the legs of said support members, wherein each ground engaging member is removably mounted on the lower end of one of said legs of said support members for permitting removal and replacement of said ground engaging member.

5. The support assembly of claim 4 wherein each of said ground engaging members comprises a foot removably mounted on the lower end of one of said legs, each said foot comprising a socket portion for receiving the lower end of one of said legs and a pad portion swivelly coupled to said socket portion for permitting adjustment of an orientation of said pad portion with respect to said socket portion.

6. The support assembly of claim 5 wherein the pad portion of each foot has a non-skid material coupled to a bottom face of said pad portion for resisting sliding of said bottom face with respect to a supporting surface.

7. The support assembly of claim 4 wherein each of said ground engaging members comprises a caster wheel assembly, each caster wheel assembly comprising:

a base member;

at least one wheel rotatably mounted on said base member; and a mounting member mounted on said base member and being adapted for removably mounting on the lower end of one of said legs, said mounting member being rotatably mounted on said base member for rotation about a first axis.

8. A The support assembly of claim 7 wherein a pair of wheels are mounted on said base member with each of said pair of wheels being mounted on opposite sides of said base member.

9. The support assembly of claim 7 wherein said mounting member is mountable on the lower end of one of said legs such that said first axis is substantially collinear with a longitudinal axis of said leg so that said base member and said at least one wheel rotates about the longitudinal axis of said leg.

10. The support assembly of claim 7 wherein at least one of said caster wheel assemblies comprises a locking caster wheel assembly having a locking mechanism for selectively preventing rotation of said wheel mounted thereon about a substantially horizontal axis.

11. The support assembly of claim 1 wherein said strap is stretched substantially straight when said support members are in said opening position.

12. The support assembly of claim 1 wherein said strap comprises a first strap and wherein said spanning assembly includes a second strap, said first and second straps being laterally spaced to form a gap for positioning a portion of said car seat when said support members are in said open position.

13. An infant car seat support assembly comprising:

a pair of support members, each support member having a pair of legs and a cross member extending between upper ends of said pair of legs, at least one of said cross members being adapted for securely engaging an infant car seat clip positioned proximate a back of an infant car seat for supporting said infant car seat in an elevated position, said support members being pivotally coupled to each other such that said cross members are pivotable with respect to each other between a collapsed position and an open position, a support bar extending between the pair of legs of each of the support members; and a spanning assembly for removably linking the cross members of said pair of legs, said spanning assembly having opposite ends defining a length of said spanning assembly therebetween, each end being couplable to a respective one of said cross members for restricting movement of said cross members away from each other a distance greater than the length of said spanning assembly when said support members are moved into said open position, said spanning assembly comprising:
a strap extending between the ends of said spanning assembly, a first end portion of said strap being formed into a loop looped about a first one of said cross members for securing said strap to said first cross member, said first end portion being mounted to an intermediate portion of said strap to form said loop;

a slide buckle being slidably mounted on said strap between said first end portion and a second end portion of said strap, said second end portion being mounted on said slide buckle such that said second end portion is slidably mounted on said strap to form a loop having an adjustable perimeter size;

a clip assembly mounted on the strap in a manner permitting sliding of said clip assembly along said strap, said clip assembly comprising:
   a base loop having a portion of said strap extending therethrough; and
   a clip swivelly mounted on said base loop;

a ring being mounted on a second one of said cross members, said ring being adapted for being removably engaged by said clip of said clip assembly, said ring being mounted on said second cross member by a band looped about said second cross member; and a ground engaging member mounted on a lower end of each of the legs of said support members, wherein each ground engaging member is removably mounted on the lower end of one of said legs of said support members for permitting removal and replacement of said ground engaging member;

wherein each of said ground engaging members comprises a caster wheel assembly, each caster wheel assembly comprising:
   a base member;
   a pair of wheels rotatably mounted on said base member with each of said pair of wheels being mounted on opposite sides of said base member; and
   a mounting member mounted on said base member and being adapted for removably mounting on the lower end of one of said legs, said mounting member being rotatably mounted on said base member for rotation about a first axis, said mounting member being mountable on the lower end of one of said legs such that said first axis is substantially collinear with a longitudinal axis of said leg so that said base member and said at least one wheel rotates about the longitudinal axis of said leg, said mounting member having a portion insertable into the lower end of one of said legs;

wherein at least two of said caster wheel assemblies comprise locking caster wheel assemblies, each locking caster wheel assembly having a locking mechanism for preventing rotation of said wheel about a substantially horizontal axis for preventing movement of said support assembly.

14. An infant car seat support assembly comprising:

a pair of support members, each support member having a pair of legs and a cross member extending between upper ends of said pair of legs, at least one of said cross members being adapted for securely engaging an infant car seat clip positioned proximate a back of an infant car seat for supporting said infant car seat in an elevated position, said support members being pivotally coupled to each other such that said cross members are pivotable with respect to each other between a collapsed position and an open position; and a spanning assembly for removably linking the cross members of said pair of legs, said spanning assembly having opposite ends defining a length of said spanning assembly therebetween, each end being couplable to a respective one of said cross members for restricting movement of said cross members away from each other a distance greater than the length of said spanning assembly when said support members are moved into said open position, wherein said spanning assembly comprises:
   a strap extending between the ends of said spanning assembly, a first end portion of said strap being formed into a loop looped about a first one of said cross members for securing said strap to said first cross member; and
   a slide buckle being slidably mounted on said strap between said first end portion and a second end portion of said strap, said second end portion being mounted on said slide buckle such that said second end portion is slidably mounted on said strap to form a loop having an adjustable perimeter size.

15. The support assembly of claim 14 wherein the spanning assembly further comprises:

a clip assembly mounted on the strap in a manner permitting sliding of said clip assembly along said strap, said clip assembly comprising:
   a base loop having a portion of said strap extending therethrough; and
   a clip swivelly mounted on said base loop; and a ring being mounted on a second one of said cross members, said ring being adapted for being removably engaged by said clip of said clip assembly, said ring being mounted on said second cross member by a band looped about said second cross member.

* * * * *